US006819641B1

(12) United States Patent
Terao et al.

(10) Patent No.: US 6,819,641 B1
(45) Date of Patent: Nov. 16, 2004

(54) APPARATUS AND METHOD OF RECORDING INFORMATION

(75) Inventors: Kyoichi Terao, Tokorozawa (JP); Hiroshi Iwamura, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 721 days.

(21) Appl. No.: 09/610,006

(22) Filed: Jul. 5, 2000

(30) Foreign Application Priority Data

Jul. 5, 1999 (JP) .......................................... P11-190720

(51) Int. Cl.[7] .............................. G11B 5/09; G11B 7/00
(52) U.S. Cl. ............................... 369/47.16; 369/44.27; 369/53.37; 369/53.45
(58) Field of Search .......................... 369/59.26, 47.16, 369/44.27, 44.31, 47.39, 53.37, 53.45, 47.55; 386/46, 52, 65, 111; 704/230, 500, 501, 503, 504, 229; 708/400; 360/32, 39

(56) References Cited

U.S. PATENT DOCUMENTS

| | | | | |
|---|---|---|---|---|
| 4,616,271 A | * | 10/1986 | Yasukawa et al. | ............. 360/32 |
| 4,858,217 A | | 8/1989 | Fujiie et al. | |
| 5,199,078 A | * | 3/1993 | Orglmeister | ................. 704/230 |
| 5,566,154 A | * | 10/1996 | Suzuki | ..................... 369/59.26 |
| 5,848,391 A | | 12/1998 | Bosi et al. | |
| 5,859,788 A | * | 1/1999 | Hou | ............................ 708/400 |
| 5,867,819 A | * | 2/1999 | Fukuchi et al. | ............. 704/500 |
| 6,522,829 B1 | * | 2/2003 | Muramatsu et al. | ........... 386/52 |
| 6,577,805 B1 | * | 6/2003 | Hirai | ............................ 386/46 |

FOREIGN PATENT DOCUMENTS

| | | |
|---|---|---|
| JP | 63-127469 | 5/1988 |
| KR | 1996-0001485 B1 | 4/1996 |

* cited by examiner

*Primary Examiner*—William Korzuch
*Assistant Examiner*—Kim-Kwok Chu
(74) *Attorney, Agent, or Firm*—Sughrue Mion, PLLC

(57) ABSTRACT

An information recording apparatus for recording digital information inputted from outside onto an information storage medium, includes: a multiplexing unit for multiplexing the digital information by a plurality of window functions to generate a plurality of multiplied digital information, each of the plurality of window functions having a fade-out time-axis characteristic and having overlaps with neighboring window functions on time axis; a recording unit for recording the plurality of multiplied digital information corresponding to the respective window functions; an ending unit for changing ending multiplexed digital information which are the multiplied digital information corresponding to the window function including a recording end timing of the digital information to zero information, and for ending recording the digital information after recording the zero information onto the information storage medium in place of the ending multiplexed digital information.

8 Claims, 10 Drawing Sheets

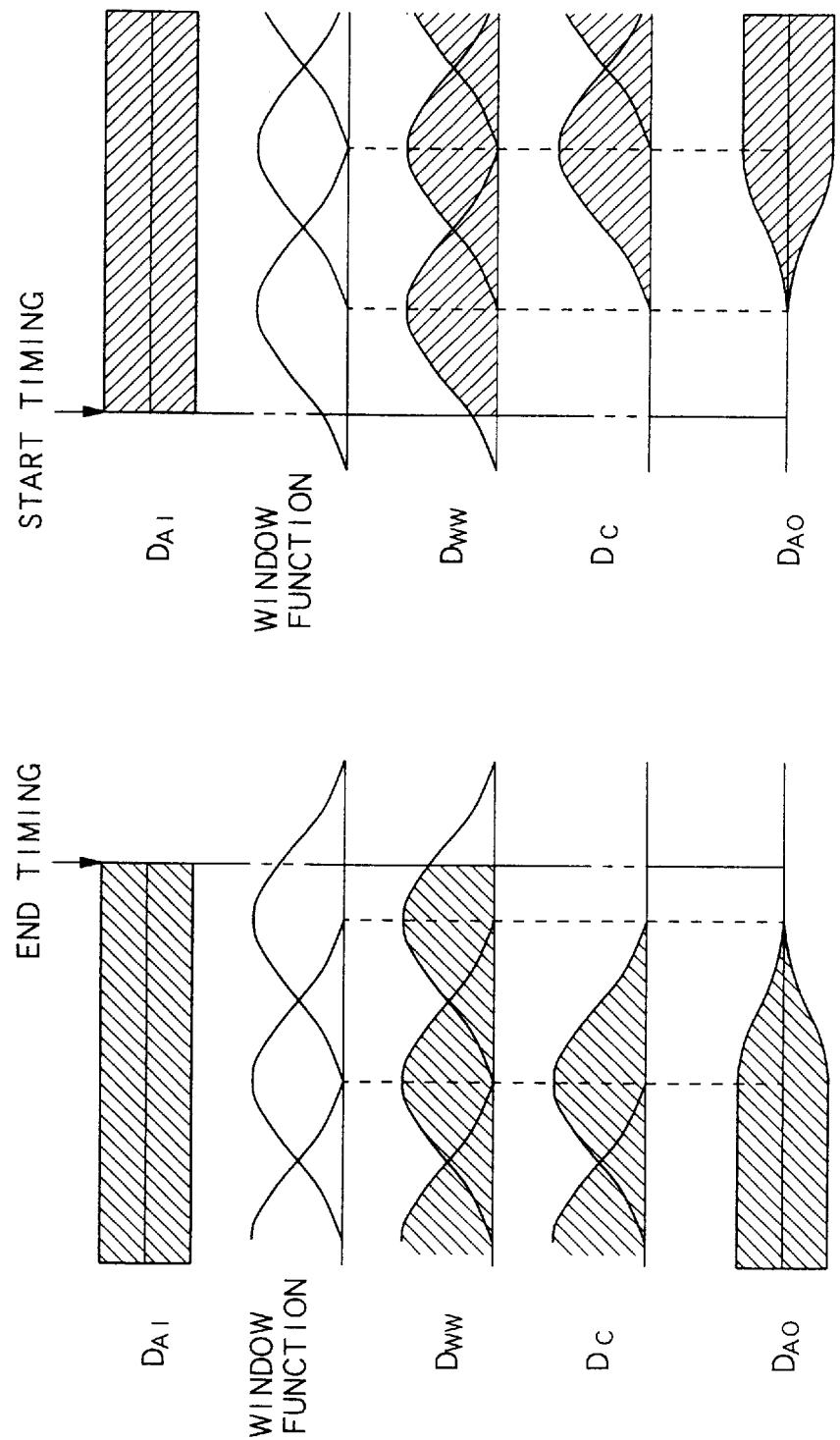

APPARATUS AND METHOD OF RECORDING INFORMATION

BACKGROUND OF THE INVENTION

1. Field of the Invention

This invention relates to an information recording apparatus and an information recording method, and more particularly to recording ending control and recording restarting control at the time of ending and restarting information recording onto an information storage medium.

2. Description of Related Art

Audio information such as voices and/or music are sometimes recorded on an information storage medium such as an optical disc after they are compressed. If the recording is temporarily interrupted or stopped in response to a temporary recording stop or interruption instruction, the input of audio information to be recorded is stopped after the reception of the instruction. When the recording restart instruction is received, the input of the audio information to be recorded is restarted to restart the information recording.

According to a conventional control method of the recording interruption and restart which controls input state of the audio information to be recorded, if data to be recorded at the time of interruption and restart have large level difference therebetween and the audio information including the interrupted portion is continuously reproduced, a sudden noise may possibly occur at the interruption timing.

This problem may occur at the time of simply stopping the audio information recording and at the time of reproducing recorded information which includes recording interrupted portion recorded with high recording level. This problem may also occur at the time of simply starting new audio information recording and at the time of reproducing recorded information which include recording start portion record with high recording level.

In order to overcome this problem, fade-out and fade-in processing are introduced. Namely, at the time of interruption or ending of recording (hereinafter referred to as "recording interruption time"), the audio information to be recorded is faded out after the recording interruption instruction is received. At the time of restart or start of recording (hereinafter referred to as "recording restart time"), the audio information to be recorded is faded in after the recording restart instruction is received. Thus, the audio information recording level at the recording interruption time and the recording restart time are made substantially zero level. Here, "fade-out" is processing which gradually decreases the recording level of audio information finally down to zero level, and "fade-in" is processing which sets the recording level of audio information to zero at first and then gradually increases the recording level up to a normal level.

However, in the fade-out and fade-in processing, it is necessary to gradually decrease the recording level within a predetermined time period after the instruction of recording interruption, and again gradually increase the level. Therefore, if audio information is recorded after compression, the recording processing becomes complicated.

SUMMARY OF THE INVENTION

It is an object of the present invention to provide information recording apparatus and method which achieve fade-in and fade-out with simple processing and which enable information recording such that undesired sudden noise is avoided at the time of reproducing recorded information at the portion including the recording interruption and restart points.

According to one aspect of the present invention, there is provided an information recording apparatus for recording digital information inputted from outside onto an information storage medium, including: a multiplexing unit for multiplexing the digital information by a plurality of window functions to generate a plurality of multiplied digital information, each of the plurality of window functions having a fade-out time-axis characteristic and having overlaps with neighboring window functions on time axis; a recording unit for recording the plurality of multiplied digital information corresponding to the respective window functions; an ending unit for changing ending multiplexed digital information which are the multiplied digital information corresponding to the window function including a recording end timing of the digital information to zero information, and for ending recording the digital information after recording the zero information onto the information storage medium in place of the ending multiplexed digital information.

According to the same aspect of the present invention, there is provided an information recording method for recording digital information inputted from outside onto an information storage medium, including the steps of: multiplexing the digital information by a plurality of window functions to generate a plurality of multiplied digital information, each of the plurality of window functions having a fade-out time-axis characteristic and having overlaps with neighboring window functions on time axis; recording the plurality of multiplied digital information corresponding to the respective window functions; changing ending multiplexed digital information which are the multiplied digital information corresponding to the window function including a recording end timing of the digital information to zero information, and ending recording the digital information after recording the zero information onto the information storage medium in place of the ending multiplexed digital information.

In accordance with the above information recording apparatus and method, the window functions which are multiplied by the digital information has the time-axis characteristics. When the recording of the digital information is ended, the ending multiplexed digital information is changed to zero information and the recording of the digital information is ended after the zero information is recorded on the information storage medium in place of the ending multiplexed digital information. By this, the recording level variation of the digital information just before the ending of the recording becomes similar to the fade-out characteristic of the window function. Therefore, the fade-out is achieved by a simple processing at the recording ending time of the digital information, and it is possible to avoid noise generation at the time of reproduction, due to the sudden decrease of the digital information recording level.

According to still another aspect of the present invention, there is provided an information recording apparatus for recording digital information inputted from outside onto an information storage medium, including: a multiplexing unit for multiplexing the digital information by a plurality of window functions to generate a plurality of multiplied digital information, each of the plurality of window functions having a fade-in time-axis characteristic and having overlaps with neighboring window functions on time axis; a recording unit for recording the plurality of multiplied digital information corresponding to the respective window functions; a starting unit for changing the multiplied digital information corresponding to the window function including a recording start timing of the digital information to zero information, and for starting recording the digital information to be recorded after the recording start timing, after recording the zero information onto the information storage medium.

According to similar aspect of the invention, there is provided an information recording method for recording digital information inputted from outside onto an information storage medium, including the steps of: multiplexing the digital information by a plurality of window functions to generate a plurality of multiplied digital information, each of the plurality of window functions having a fade-in time-axis characteristic and having overlaps with neighboring window functions on time axis; recording the plurality of multiplied digital information corresponding to the respective window functions; changing the multiplied digital information corresponding to the window function including a recording start timing of the digital information to zero information, and starting recording the digital information to be recorded after the recording start timing, after recording the zero information onto the information storage medium.

In accordance with the above information recording apparatus and method, the window functions which are multiplied by the digital information has the time-axis characteristics. When the recording of the digital information is started, the multiplexed digital information corresponding to the window function including the recording start timing is changed to zero information, and the recording of the digital information is started after the zero information is recorded. By this, the recording level variation of the digital information just after the start of the recording becomes similar to the fade-in characteristic of the window function. Therefore, the fade-in is achieved by a simple processing at the start time of the digital information, and it is possible to avoid noise generation at the time of reproduction, due to the sudden decrease of the digital information recording level.

According to still another aspect of the present invention, there is provided an information recording apparatus for recording digital information inputted from outside onto an information storage medium, including: a multiplexing unit for multiplying the digital information by a plurality of window functions to generate a plurality of multiplied digital information, each of the plurality of window functions having a time-axis characteristic including a fade-in portion and a fade-out portion and having overlaps with neighboring window functions on time axis; a recording unit for recording the plurality of multiplied digital information corresponding to the respective window functions; an interruption unit for changing interruption multiplexed digital information which are the multiplied digital information corresponding to the window function including a recording interruption timing of the digital information to zero information, and for interrupting recording the digital information after recording the zero information onto the information storage medium in place of the interruption multiplexed digital information; and a restarting unit for changing the multiplied digital information corresponding to the window function including a recording restart timing of the digital information to zero information, and for restarting recording the digital information to be recorded after the recording restart timing, after recording the zero information onto the information storage medium.

According to the similar aspect of the present invention, there is provided an information recording method for recording digital information inputted from outside onto an information storage medium, including the steps of: multiplying the digital information by a plurality of window functions to generate a plurality of multiplied digital information, each of the plurality of window functions having a time-axis characteristic including a fade-in portion and a fade-out portion and having overlaps with neighboring window functions on time axis; recording the plurality of multiplied digital information corresponding to the respective window functions; changing interruption multiplexed digital information which are the multiplied digital information corresponding to the window function including a recording interruption timing of the digital information to zero information, and interrupting recording the digital information after recording the zero information onto the information storage medium in place of the interruption multiplexed digital information; and changing the multiplied digital information corresponding to the window function including a recording restart timing of the digital information to zero information, and restarting recording the digital information to be recorded after the recording restart timing, after recording the zero information onto the information storage medium.

In accordance with the above information recording apparatus and method, the window function which are multiplied by the digital information have a time-axis characteristic including fade-in portion and fade-out portion. When the digital information recording is interrupted, the interruption digital information is changed to zero information and the recording of the digital information is interrupted after the zero information is recorded on the information storage medium. When the digital information recording is restarted, the multiplexed digital information corresponding to the window function including the recording restart timing is changed to zero information and the digital information recording is restarted after the zero information is recorded on the information storage medium. Thus, the digital information recording level just before the interruption or just after the restart become similar to the fade-out or fade-in characteristic of the window function. Therefore, the fade-out and fade-in can be achieved by a simple processing at the interruption/restart time of the digital information, and it is possible to avoid noise generation at the time of interruption/restart, due to the sudden great variation of the digital information recording level.

According to still another aspect of the present invention, there is provided an information recording apparatus for recording digital information inputted from outside onto an information storage medium, including: a multiplexing unit for multiplexing the digital information by a plurality of window functions to generate a plurality of multiplied digital information, each of the plurality of window functions having a time-axis characteristic including a fade-in portion and a fade-out portion and having overlaps with neighboring window functions on time axis; a recording unit for recording the plurality of multiplied digital information corresponding to the respective window functions; an interruption unit for changing the digital information including a recording interruption timing of the digital information to zero information, and for interrupting recording the digital information after recording the zero information onto the information storage medium in place of the multiplexed digital information including the recording interruption timing; and a restarting unit for changing, after a recording interruption, the digital information including a recording restart timing of the digital information to zero information, and for restarting recording the digital information to be recorded after the recording restart timing, after recording the zero information onto the information storage medium in place of the multiplexed digital information including the recording restart timing.

According to the similar aspect of the present invention, there is provided an information recording method for recording digital information inputted from outside onto an information storage medium, including the steps of: multiplexing the digital information by a plurality of window functions to generate a plurality of multiplied digital information, each of the plurality of window functions having a time-axis characteristic including a fade-in portion and a fade-out portion and having overlaps with neighboring window functions on time axis; recording the plurality of multiplied digital information corresponding to the respective window functions; changing the digital information including a recording interruption timing of the digital information to zero information, and interrupting recording the digital information after recording the zero information onto the information storage medium in place of the multiplexed digital information including the recording interruption timing; and changing, after a recording interruption, the digital information including a recording restart timing of the digital information to zero information, and restarting recording the digital information to be recorded after the recording restart timing, after recording the zero information onto the information storage medium in place of the multiplexed digital information including the recording restart timing.

In accordance with the above information recording apparatus and method, the window functions which are multiplied by the digital information have a time-axis characteristic including fade-in portion and fade-out portion. When the digital information recording is interrupted, the digital information including the recording interruption timing is changed to zero information and the recording of the digital information is interrupted after the zero information is recorded on the information storage medium in place of the multiplexed digital information including the recording interruption timing. When the digital information recording is restarted, the digital information including the recording restart timing is changed to zero information and the digital information recording is restarted after the zero information is recorded on the information storage medium in place of the multiplexed digital information including the recording restart timing. Thus, the digital information recording level just before the interruption or just after the restart become similar to the fade-out or fade-in characteristic of the window function. Therefore, the fade-out and fade-in can be achieved by a simple processing at the interruption/restart time of the digital information, and it is possible to avoid noise generation at the time of interruption/restart, due to the sudden great variation of the digital information recording level.

Preferably, each of the window functions has the overlap for a half of a time period of the window function on a time-axis. By this, the multiplexed digital information which accurately corresponds to the original information can be generated and recorded.

In a preferred embodiment, the digital information may be audio information. By this, the noise generation can be avoided at the recording end, start and interruption/restart time of recorded audio information.

Further, in a preferred embodiment, the window function may be adapted to remove distortion in Modified Discrete Cosine transform coding system. Thus, the fade-out and fade-in can be achieved by a simple processing at ending, start and interruption/restart time of the digital information recording using MDCT coding system, and it is possible to avoid noise generation.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 6A is a timing chart showing filtering processing according to the first embodiment at recording end time;

FIG. 6B is a timing chart showing processing according to the first embodiment at recording start time;

DETAILED DESCRIPTION OF THE PREFERRED EMBODIMENTS

The preferred embodiments of the present invention will now be described below with reference to the attached drawings.

It is noted that, in the following embodiments, the present invention is applied to an information recording and reproducing apparatus which records digital audio and video (picture) information on an optical disc and reproduces recorded information from the optical disc.

[I] 1st Embodiment

A first embodiment of the present invention will be described with reference to FIGS. 1 to 8. First of all, a configuration and rough operation of an information recording and reproducing apparatus of the first embodiment will be described.

Figure 1:
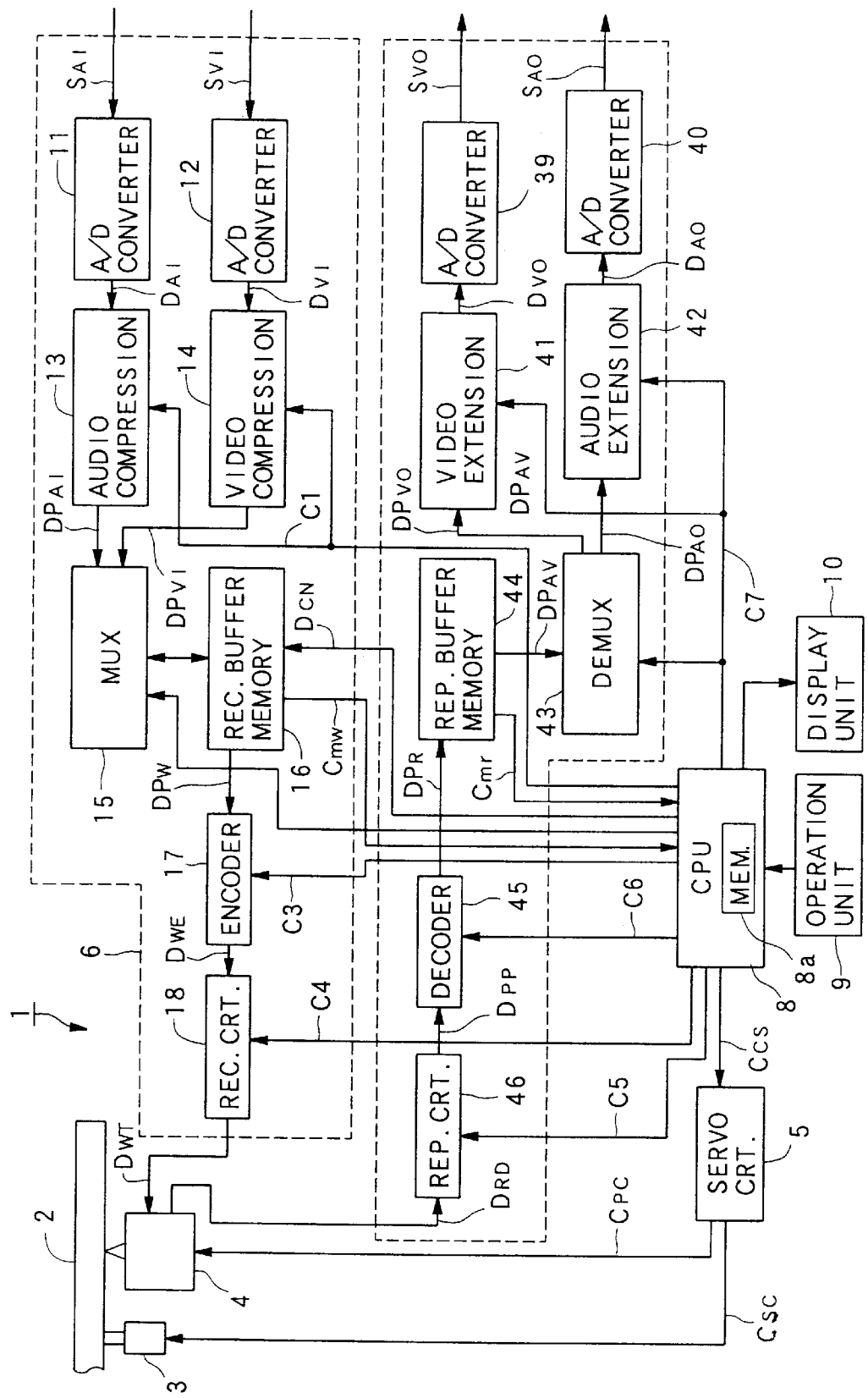
FIG. 1 is a block diagram showing schematic configuration of an information recording and reproducing apparatus according to the present invention.

As shown in FIG. 1, the information recording and reproducing apparatus 1 includes a spindle motor 3, a pickup 4, a servo circuit 5, a recording system 6, a reproducing system 7, a central control circuit 8, an operation unit 9 and a display unit 10. The spindle motor 3 rotationally drives an optical disc 2 serving as an information storage medium. The pickup 4 optically records recording data $D_{WT}$ onto the optical disc 2 and detects detection data $D_{RD}$ from the optical disc 2. The servo circuit 5 performs servo control of the spindle motor 3 and the pickup 4. The recording system 6 generates the recording data $D_{WT}$ to be recorded on the optical disc 2. The reproducing system 7 applies reproduction processing onto the detection data $D_{RD}$ detected from the optical disc 2 and outputs a video signal $S_{VO}$ and an audio signal $S_{AO}$ to outside. The central control circuit 8 performs overall control of the information recording and reproducing apparatus 1. The operation unit 9 is used by a user to input desired instructions including recording interruption and restart to the central control circuit 8.

The recording system 6 includes A/D converters 11, 12, an audio compression circuit 13, a video compression circuit 14, a multiplexing circuit 15, a recording buffer memory 16, an encoder 17, and a recording circuit 18. The reproducing system 7 includes D/A converters 39, 40, a video extension (decompression) circuit 41, an audio extension (decompression) circuit 42, a demultiplexing circuit 43, a reproduction buffer memory 44, a decoder 45, and an reproducing circuit 46. The central control circuit 8 includes a memory 8a for storing preset system program, and is constituted by a microprocessor (CPU) which performs overall control of the information recording and reproducing apparatus 1 by executing the system program.

Next, the rough operation of the recording system 6 will be described. First, the A/D converter 11 converts the analog audio signal $S_{AI}$ supplied from outside into the digital audio data $D_{AI}$ and outputs it to the audio compression circuit 13. The audio compression circuit 13 compresses the audio data $D_{AI}$ based on the MDCT compression system designated by the control signal $C_1$ from the central control circuit 8, generates the compressed audio data $DP_{AI}$ and outputs it to the multiplexing circuit 15. Simultaneously, the A/D converter 12 converts the analog video signal $S_{VI}$ supplied from outside into the digital video data $D_{VI}$ and outputs it to the video compression circuit 14. The video compression circuit 14 compresses the video data $D_{VI}$ based on the data compression system (e.g., MPEG (Moving Picture Experts Group)) designated by the control signal $C_1$ from the central control circuit 8, generates the compressed video data $DP_{VI}$ and outputs it to the multiplexing circuit 15.

When a user inputs a recording start instruction by the operation unit 9, the multiplexing circuit 15 performs time-division multiplexing onto the compressed audio data $DP_{AI}$ and the compressed video data $DP_{VI}$, with cooperating with the recording buffer memory 16, according to the timing designated by the control signal $C_2$ from the central control circuit 8, and outputs the time-division-multiplexed compressed data $DP_W$ to the encoder 17. At this time, the recording buffer memory 16 temporarily stores the compressed audio data $DP_{AI}$ and the compressed video data $DP_{VI}$ and generates the compressed data $DP_W$ by the cooperation with the multiplexing circuit 15. Simultaneously, the recording buffer memory 16 sends the data amount signal Cmw indicating the data amount (or data length) of the compressed data $DP_W$ generated by the multiplexing circuit 15 to the central control circuit 8. The central control circuit 8 displays the data amount of the compressed data $DP_W$ in the form of characters or else based on the data amount signal Cmw.

The encoder 17 encodes the compressed data $DP_W$ based on the control signal $C_3$ supplied from the central control circuit 8 to produce encoded data $D_{WE}$ and outputs it to the recording circuit 18. The recording circuit 18 applies, based on the control signal $C_4$ supplied from the central control circuit 8, predetermined processing including amplification onto the encoded data $D_{WE}$ to produce recording data $D_{WT}$, and outputs it to the pickup 4. Thus, the light source in the pickup 4, such as a semiconductor laser, is driven in correspondence with the recording data $D_{WT}$, so that the light beam having intensity corresponding to the recording data $D_{WT}$ is emitted, and the recording data $D_{WT}$ is optically recorded on the optical disc 2.

Next, the rough operation of the reproducing system 7 will be described. First, the reproducing circuit 46 applies waveform-shaping processing, based on the control signal $C_5$ supplied from the central control circuit 8, onto the detection data $D_{RD}$ (RF (Radio Frequency) signal) detected from the optical disc 2 by the pickup 4 to generate binary reproduction data $D_{PP}$, and outputs it to the decoder 45. The decoder 45 decodes the reproduction data $D_{PP}$, based on the control signal $C_6$ supplied from the central control circuit 8, according to the predetermined decoding system corresponding to the encoding system of the encoder 17, and generate and output the decode data $DP_R$ to the reproduction buffer memory 44. Then, the reproduction buffer memory 44 temporarily stores the decode data $DP_R$, and rearranges the stored decode data $DP_R$ to be decode data $DP_{AV}$ synchronized with preset timing, which is outputted to the demultiplexing circuit 43.

Simultaneously, the reproduction buffer memory 44 transfers the data amount signal Cmr indicating the data amount (or data length) of the inputted decode data $DP_R$ to the central control circuit 8. The central control circuit 8 displays the data amount of the decode data $DP_R$ on the display unit 10 in the form of characters or else based on the data amount signal Cmr. By this, the demultiplexing circuit 43 separates the compressed video data $DP_{VO}$ and the compressed audio data $DP_{AO}$ multiplexed in the decode data $DP_{AV}$ from each other based on the control signal $C_7$ supplied from the central control circuit 8. Then, the demultiplexing circuit 43 outputs the compressed video data $DP_{VO}$ to the video extending circuit 41, and outputs the compressed audio data $DP_{AO}$ to the audio extending circuit 42. The compressed audio data $DP_{AO}$ is frequency-domain data to which FFT processing (First Fourier Transform) is applied at the time of recording. The video extending circuit 41 applies, based on the control signal $C_7$ supplied from the central control circuit 8, predetermined extension processing corresponding to the compression system of the video compression circuit 14 onto the compressed video data $DP_{VO}$ to generate extended video data $D_{VO}$, and outputs it to the D/A converter 39. The D/A converter 39 converts the video data $D_{VO}$ into analog video signal $S_{VO}$, and outputs it to outside.

Simultaneously, the audio extending circuit 42 applies predetermined extending processing corresponding to the compression system of the audio compression circuit 13, based on the control signal $C_7$ supplied from the central control circuit 8, to generate extended audio data $D_{AO}$, and outputs it to the D/A converter 40. The D/A converter 40 converts the audio data $D_{AO}$ into analog audio signal $S_{AO}$, and outputs it to outside.

In executing the above-described recording and reproducing operation, the central control circuit 8 generates the control signals $C_1$ to $C_7$ for controlling the operation of the servo circuit 5, the recording system 6 and the reproducing system 7, and outputs them to the respective elements. In addition, the central control circuit 8 receives the instruction from the user via the operation unit 9, and displays, on the display unit 10, current operation state of the information recording and reproducing apparatus 1, various information related to the recorded information and menu picture for instructing the user of the operation method of the information recording and reproducing apparatus 1.

Further, the central control circuit 8 generates the control signal $C_{CS}$ and outputs it to the servo circuit 5 so that the servo circuit 5 executes tracking servo and focus servo control for accurately positioning the in-focus position of the light beam B on the information recording surface of the optical disc 2 and the spindle servo control for controlling the rotation number of the spindle motor 3. The servo circuit 5 generates the servo control signal $C_{PC}$ for executing the tracking servo control and the focus servo control based on the control signal $C_{CS}$, and outputs it to an actuator within the optical pickup 4 (not shown) for driving an objective lens used to make the light beam B converged on the optical disc 2. The servo circuit 5 also generates the servo control signal $C_{SC}$ for performing the spindle servo control and outputs it to the spindle motor 3.

Figure 2A:
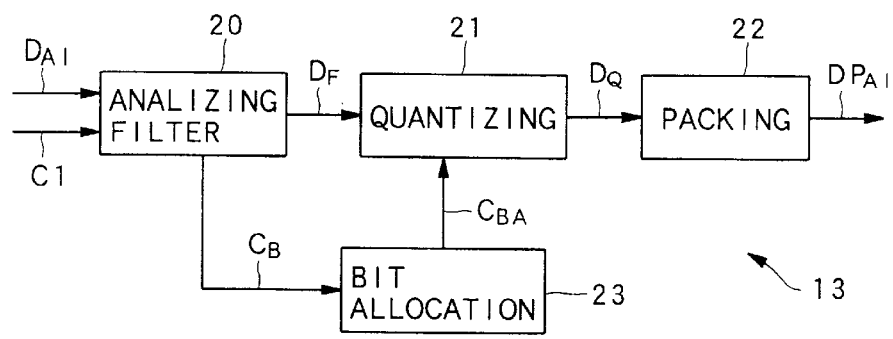
FIG. 2A is a block diagram showing detailed configuration of an audio compression circuit.
Figure 2B:
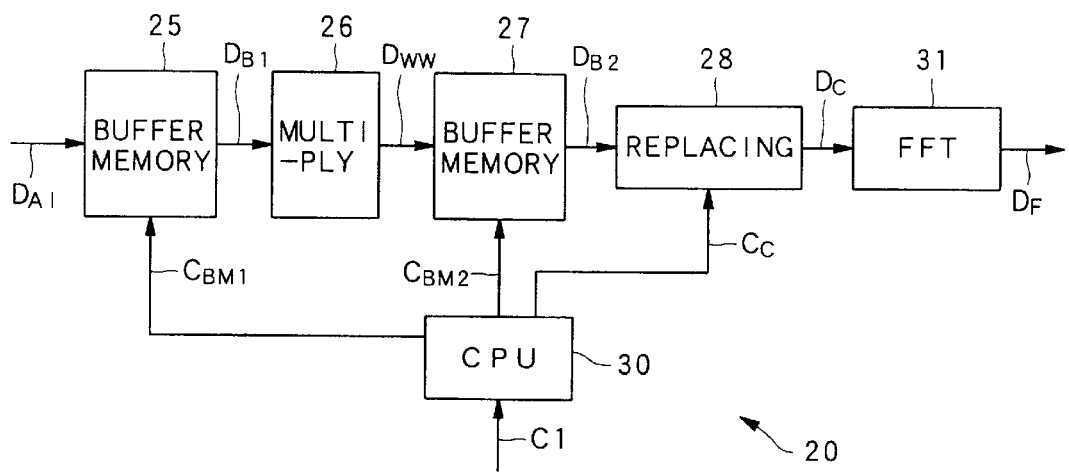
FIG. 2B is a block diagram showing detailed configuration of an analyzing filter unit.

Next, the detailed configuration of the audio compression circuit 13 in the recording system 6 of the present invention will be described with reference to FIGS. 2A and 2B. FIG. 2A is a block diagram showing a detailed configuration of the audio compression circuit 13, and FIG. 2B is a block diagram showing a detailed configuration of an analyzing filter unit 20. As shown in FIG. 2A, the audio compression circuit 13 includes an analyzing filter unit 20, a quantizing unit 21, a packing unit 22, and a bit allocation unit 23.

Next, the operation will be described. First, the analyzing filter unit 20 applies filtering processing onto the audio data $D_{AI}$, based on the control signal $C_1$ from the central control circuit 8, to produce filtered data $D_F$, and outputs it to the quantizing unit 21. In addition, the analyzing filter unit 20 generates the control signal $C_B$ for controlling the bit allocation unit 23 and outputs it to the bit allocation unit 23. The filtering processing performed by the analyzing filter unit 20 firstly multiplies the inputted audio data $D_{AI}$ by window function having predetermined fade-in time-axis characteristic and fade-out time-axis characteristic. The filtering processing then replaces data including interruption timing and restart timing by zero data when information recording onto the optical disc 2 is interrupted or restarted, and applies FFT processing onto the resultant data. The window function is multiplied in order to avoid block distortion generated in the FFT processing and the quantizing processing in the quantizing unit 21. The block distortion is caused by the discontinuity of the connection of the neighboring blocks in the blocked audio signal $S_{AI}$ in the case where the audio signal $S_{AI}$ is recorded on the optical disc 2 after being compressed in block unit and then the audio signal $S_{AI}$ thus recorded is extended in block unit to be reproduced as the audio signal $S_{AO}$.

Then, the bit allocation unit 23 sets the bit allocation for the quantization by the quantizing unit 21 based on the control signal $C_B$, and generates and outputs the control signal $C_{BA}$ indicating the contents thus set to the quantizing unit 21. The quantizing unit 21 quantizes and compresses audio information included in the filtered signal $D_F$, based on the bit allocation contents indicated by the control signal $C_{BA}$, to generate and output the quantized audio data $D_Q$ which is outputted to the packing unit 22. Finally, the packing unit 22 packs the quantized audio data $D_Q$ into units of predetermined data amount to generate the compressed audio data $DP_{AI}$ divided by the pack unit, and outputs it to the multiplexing circuit 15.

Next, the detailed configuration of the analyzing filter unit 20 will be described with reference to FIG. 2B. As shown in FIG. 2B, the analyzing filter unit 20 includes buffer memories 25, 27, a multiplying unit 26, a replacing unit 28, a CPU 30 and an FFT unit 31.

Figure 3:
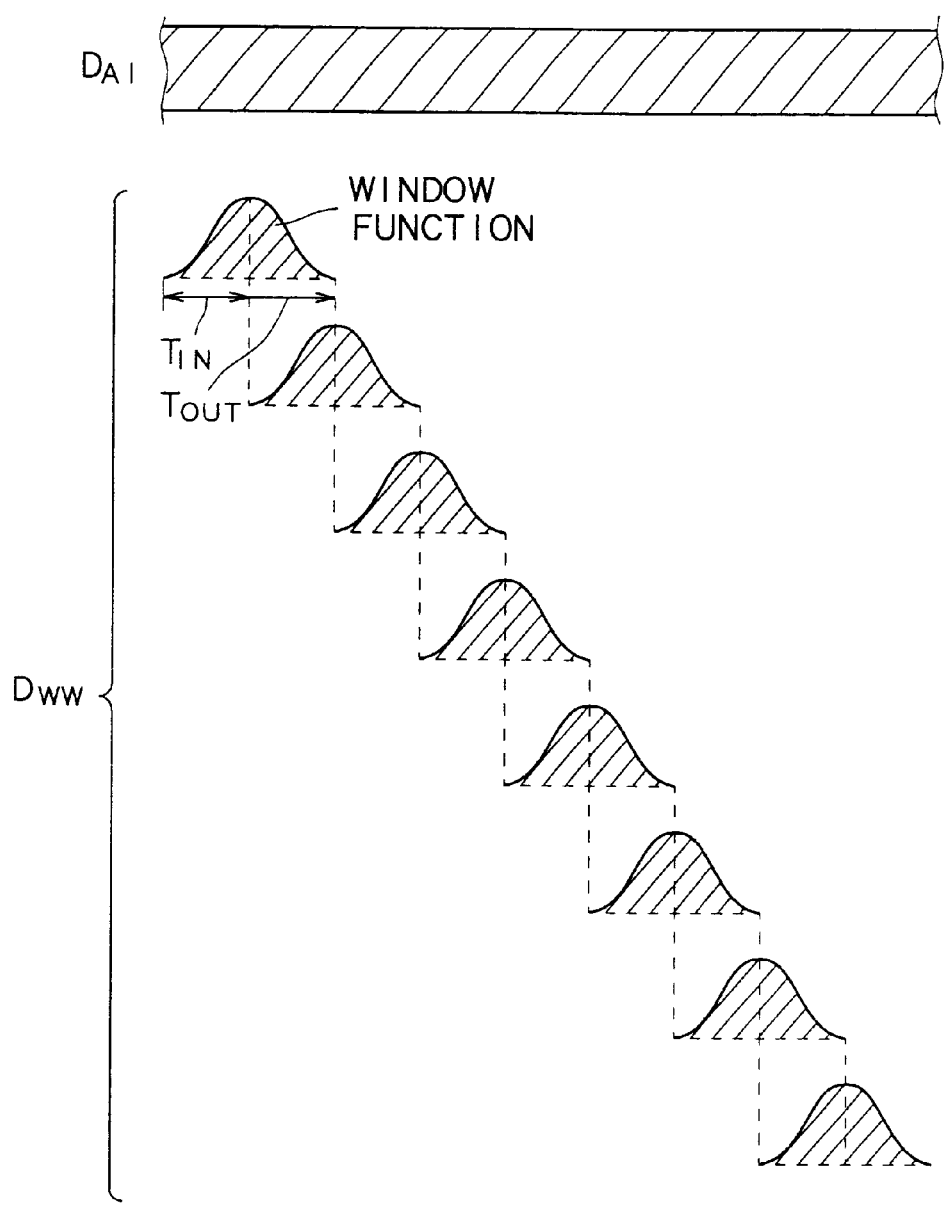
FIG. 3 is a diagram showing normal filtering processing.

Next, the detailed operation of the analyzing filter unit 20 will be described with reference to FIGS. 2B and 3. FIG. 3 is a timing chart for explaining the processing by the analyzing filter unit 20, wherein the vertical axes indicate levels of the respective signals.

First, the buffer memory 25 temporarily stores inputted audio data $D_{AI}$, by unit of predetermined data amount, based on the control signal $C_{BM1}$ from the CPU 30, and outputs the stored data to the multiplying unit 26 by unit of the predetermined data amount as the memory data $D_{B1}$. The multiplying unit 26 multiplies the inputted memory data $D_{B1}$ by the window functions as shown in FIG. 3 to generate multiplied data $D_{WW}$ for each multiplied window function (see. the lower part of FIG. 3), and outputs them to the buffer memory 27. The respective window functions, by which the memory data $D_{B1}$ is multiplied, have timely symmetrical waveform, wherein the time $T_{IN}$ during which the level fades in from zero level is continuous with the time $T_{OUT}$ during which the level fades out to zero level, and wherein the half periods of the neighboring window functions overlap with each other on the time axis. By the operation of the multiplying unit 26, the multiplied data $D_{WW}$ having waveforms similar to the respective window functions shown in FIG. 3 and being overlapped for half period, respectively, is outputted. This multiplying processing for each window function prevents the block distortion from being generated.

Then, the buffer memory 27 temporarily stores the inputted multiplied data $D_{WW}$ based on the control signal $C_{BM2}$. When window function multiplying processing for all unit memory data stored in the buffer memory 25 is finished, the buffer memory 27 outputs the multiplied data $D_{WW}$ to the replacing unit 28 as the memory data $D_{B2}$. If the information recording onto the optical disc 2 is interrupted or restarted, the replacing unit 28 replaces the memory data $D_{B2}$, which is obtained by the multiplication of the window functions including the interruption timing or restart timing, with zero data in accordance with the control signal $C_C$ from the CPU 30, and outputs them to the FFT unit 31 as the replaced data $D_C$. At this time, the memory data $D_{B2}$ other than those which are obtained by the multiplication of the window functions including the interruption timing or the restart timing are outputted to the FFT unit 31 as the data $D_C$, with no processing applied thereto. The FFT unit 31 applies FFT processing onto the data $D_C$ to convert it to frequency-domain data, and outputs it to the quantizing unit 21 as the filtered data $D_F$.

In the above-described processing, the CPU 30 generates the control signals $C_{BM1}$, $C_{BM2}$ and $C_C$, based on the control signal $C_1$, and outputs them to the respective associated elements so that appropriate processing is performed at those elements. At this time, data indicating the interruption timing, which is used in the replacing processing by the replacing unit 28, is supplied to the CPU 30 as the control signal $C_1$.

Figure 4A:
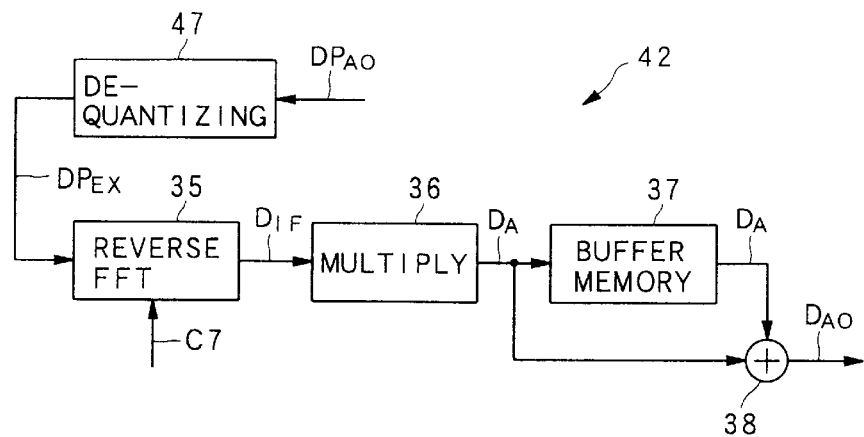
FIG. 4A is a block diagram showing configuration of an audio extension circuit.
Figure 4B:
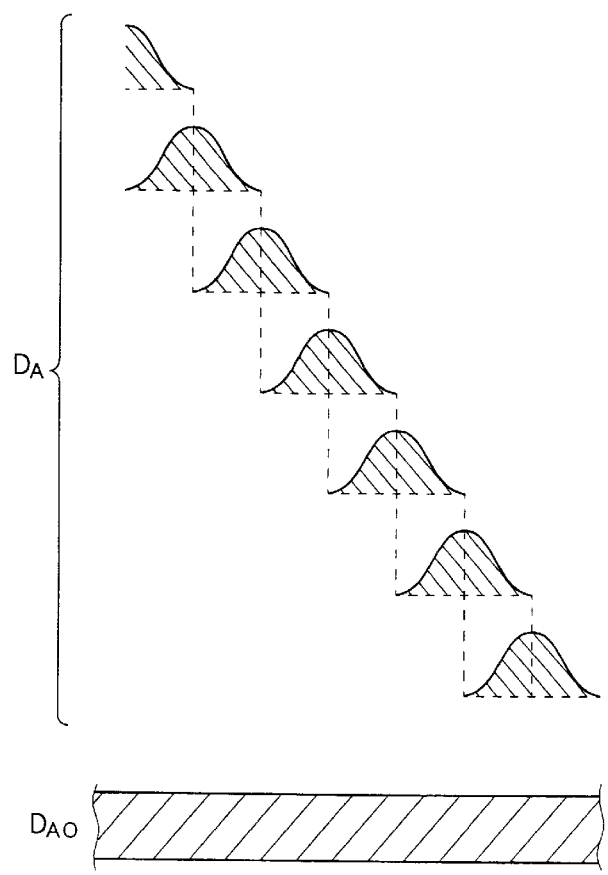
FIG. 4B is a diagram showing operation waveforms of the audio extension circuit shown in FIG. 4A.

Next, the detailed configuration and operation of the audio extension circuit 22 in the reproducing system 7 will be described with reference to FIGS. 4A and 4B. FIG. 4A is a block diagram showing the detailed configuration of the audio extension circuit 22, and FIG. 4B shows waveforms illustrating the operation of the audio extension circuit 22. As shown in FIG. 4A, the audio extension circuit 22 includes a reverse-FFT unit 35, a multiplying unit 36, a buffer memory 37, an adder 38, and a de-quantizing unit 47.

Next, the operation will be described. First, the de-quantizing unit 47 applies extension processing, corresponding to the compression processing by the quantizing unit 21, onto the compressed audio data $DP_{AO}$ inputted as frequency-domain data to generate the extended data $DP_{EX}$, and outputs it to the reverse-FFT unit 35. Then, the reverse-FFT unit 35 applies reverse-FFT conversion onto the extended data $DP_{EX}$ to generate the reverse-converted data $D_{IF}$, and outputs it to the multiplying unit 36. The multiplying unit 36 multiplies the reverse-converted data $D_{IF}$, which is time-domain data, by the above-mentioned window functions like the multiplying unit 26 to generate the multiplied data $D_A$ (having the waveform shown in the upper part of FIG. 4B), and outputs it to the buffer memory 37 and one input terminal of the adder 38. The buffer memory 37 temporarily stores the inputted multiplied data $D_A$, and outputs it to the other input terminal of the adder 38 after the time period corresponding to the half period of the above-mentioned window function has passed. The adder 38 adds the multiplied data $D_A$ directly inputted from the multiplying unit 36 to the multiplied data $D_A$ delayed by the buffer memory 37, on the time axis basis, to generate the audio data $D_{AO}$ shown at the lower portion of FIG. 4B, and outputs it to the D/A converter 40. By means of the delaying in the buffer memory 37 and the addition by the adder 38, the multiplied data $D_A$ which have been timely separated for each window function are converted to the audio data $D_{AO}$ (which corresponds to the audio data $D_{AI}$ in the recording system 6) having a uniform level.

Figure 5A:
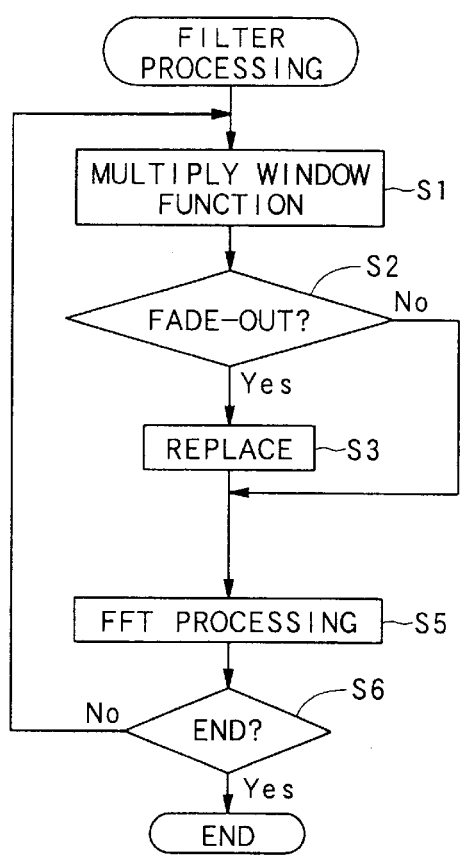
FIG. 5A is a flowchart showing filtering processing according to the first embodiment at recording end time.
Figure 5B:
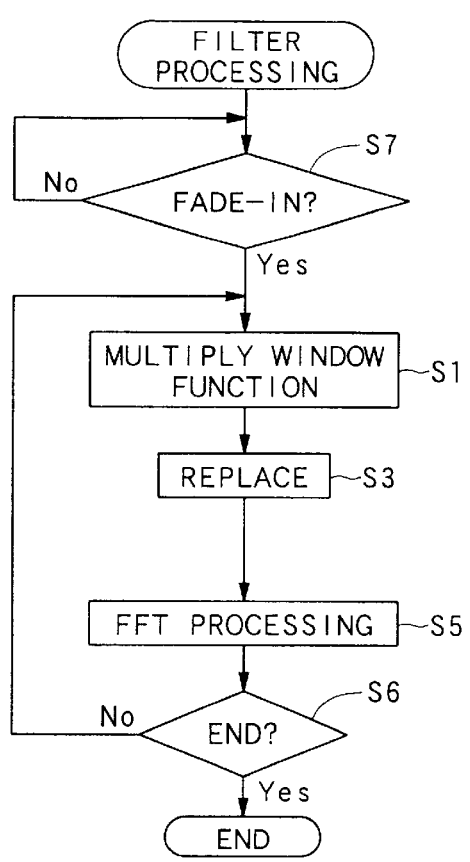
FIG. 5B is a flowchart showing filtering processing according to the first embodiment at recording start time.
Figure 7:
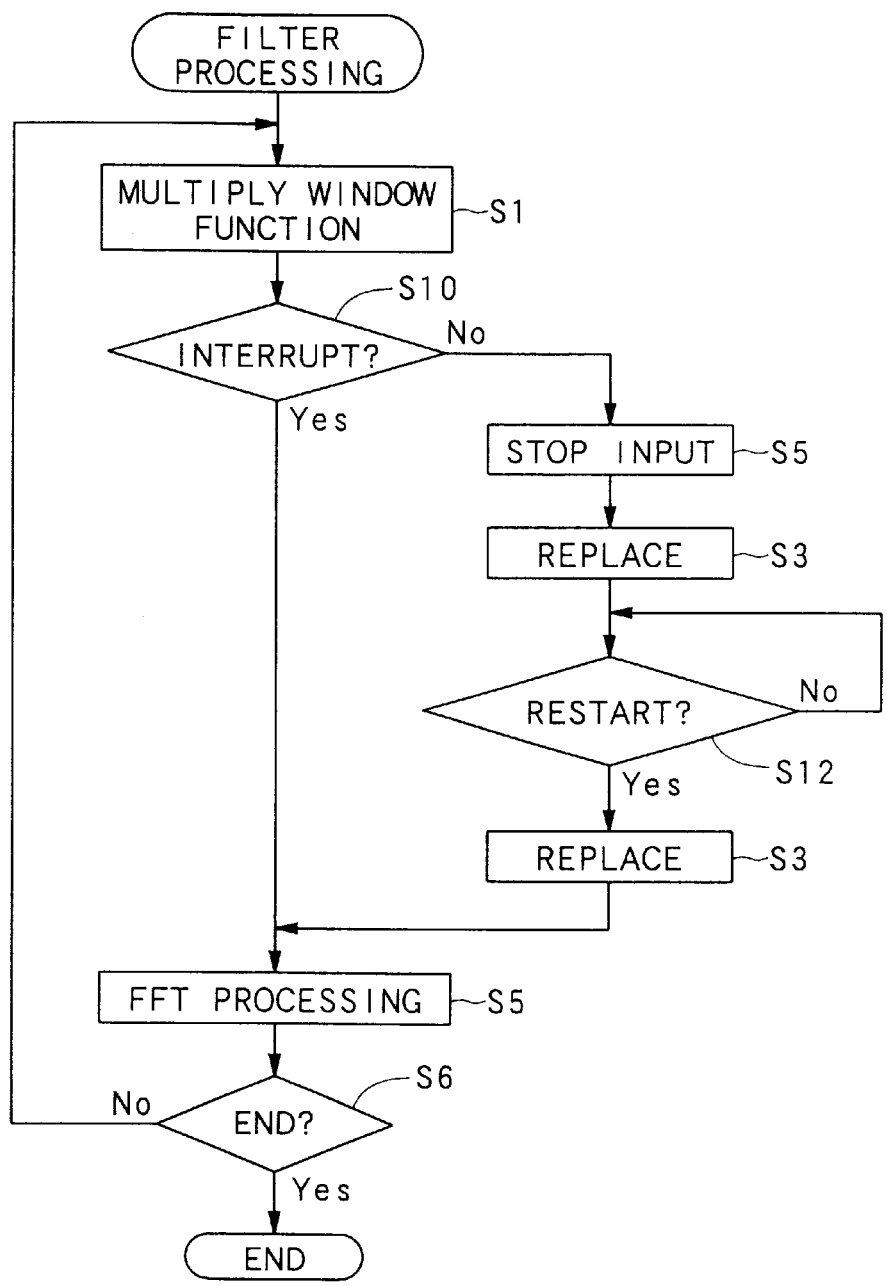
FIG. 7 is a flowchart showing filtering processing at recording interruption/restart time.
Figure 8:
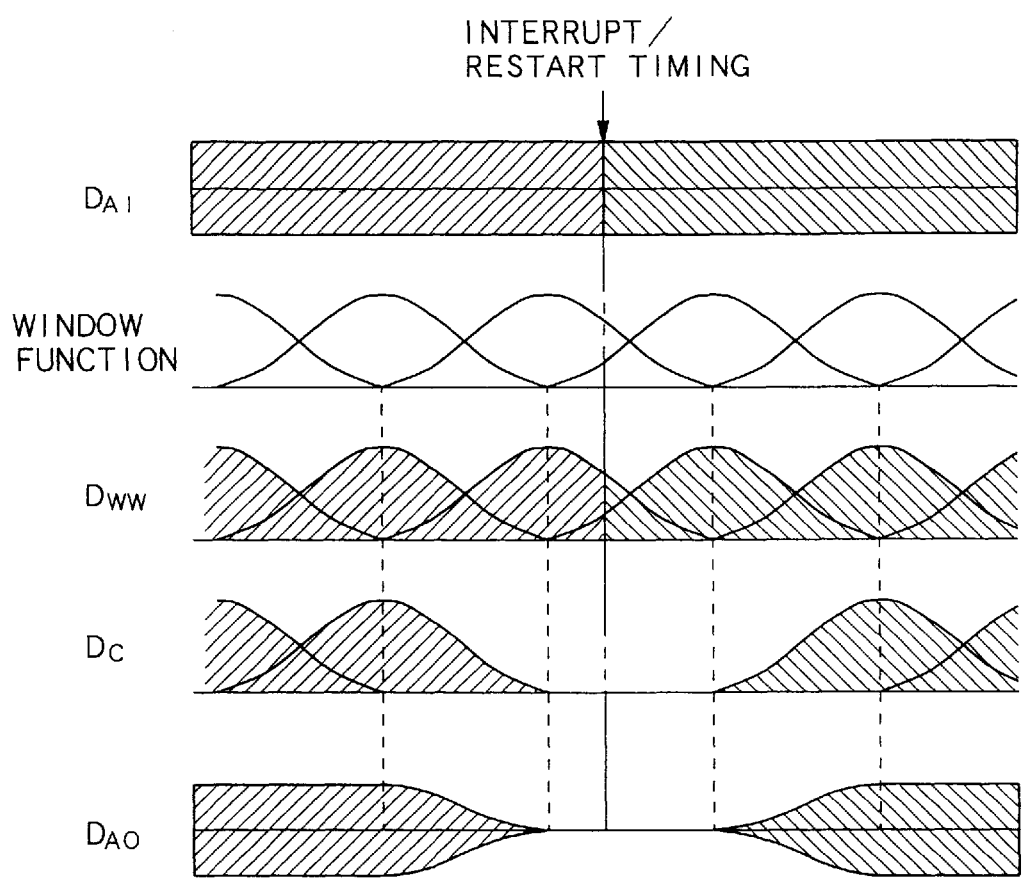
FIG. 8 is a timing chart showing filtering processing at the recording interruption/restart time.

Next, the processing in the analyzing filter 20 according to the present invention will be described with reference to FIGS. 5 to 8. FIGS. 5A and 5B are flowcharts showing the processing at the information recording ending time and the information recording start time, and FIGS. 6A and 6B are timing charts showing the data status at the information recording ending time and the information recording start time. FIG. 7 is a flowchart showing the processing at the information recording interruption/restart time, and FIG. 8 is a timing chart showing the data status at the information recording interruption/restart time. In the flowcharts shown in FIGS. 5A, 5B and 7, the same steps are represented by the same step numbers and their detailed description will not be repeated.

First, the processing at the information recording ending time will be described with reference to FIGS. 5A and 6A. At the time of ending the information recording, the analyzing filter 20 applies the multiplying process of the window functions in the multiplying unit 26 onto the audio data $D_{AI}$ (step S1). Then, it is checked whether or not the CPU 30 recognized the ending of the information recording based on the control signal $C_1$ indicating that an instruction indicating the ending of the information recording is inputted in the operation unit 9 (step S2). If the ending is not instructed (step S2;No), the memory data $D_{B2}$ stored in the buffer memory 27 is passed through the replacing unit 28 without any process applied thereon, and then the FFT unit 31 performs the above-described FFT processing (step S5). Then, it is checked whether or not filter processing is performed for all audio data $D_{AI}$ to be recorded (step S6). If all data are processed (step S6; Yes), the process ends. If all data are not processed (step S6;No), the process goes back to step S1 to perform the filter processing onto the subsequent audio data $D_{AI}$.

If the recording end instruction is detected in step S2 (step S2;Yes), out of the generated multiplied data $D_{WW}$ (see. 3rd stage in FIG. 6A), the multiplied data $D_{WW}$ obtained by multiplying the window function including the information recording ending time is replaced with zero data to generate the replaced data $D_C$ shown in the 4th stage in FIG. 6A (step S3). Then, the processing in steps S5 and S6 are performed for the replaced data $D_C$. As a result, the level of the recording data $D_{WT}$ at the recording ending time has the same fade-out characteristic as the fade-out characteristic of the replaced data $D_C$ generated immediately before the ending time. Therefore, the recording is interrupted after the signal intensity level of the recording data $D_{WT}$ is reduced according to the same fade-out characteristic as that of the replaced data $D_C$. The reproduced waveform of the audio data $D_{AO}$, which is obtained after the addition by the adder 38 at the time of reproducing the recording data $D_{WT}$, shows the same fade-out characteristic as that of the replaced data $D_C$ as shown at the bottom of FIG. 6A, and thus the reproduction is ended.

Next, the processing at the information recording start time will be described with reference to FIGS. 5B and 6B. At the time of starting the information recording, the analyzing filter unit 20 checks whether or not the CPU 30 recognized the start of the information recording based on the control signal $C_1$ indicating that an instruction indicating the start of the information recording is inputted in the operation unit 9 (step S7). If the recording start is not instructed (step S7;No), the process waits for the instruction. If the recording start is instructed (step S7; Yes), the multiplication of the window functions is applied to the inputted audio data $D_{AI}$ in the multiplying unit 26 (step S1). Then, out of the generated multiplied data $D_{WW}$ (see. 3rd stage in FIG. 6B), the multiplied data $D_{WW}$ obtained by multiplying the window function including the recording start time is replaced with zero data to generate the replaced data $D_C$ shown in the 4th stage in FIG. 6B (step S3). Then, the processing in steps S5 and S6 are performed for the replaced data $D_C$ (see. FIG. 5B). In step S6, if the processing is not completed for all audio data $D_{AI}$ (step S6; No), the process goes back to step S1 to apply the processing of steps S1, S5 and S6 onto the audio data $D_{AI}$ subsequently inputted. In this case, since the processing is applied to the audio data $D_{AI}$ after the recording start time, the replacing processing (step S3) is always skipped.

As a result, the level of the recording data $D_{WT}$ at the recording start time has the same fade-in characteristic as the fade-in characteristic of the replaced data $D_C$ generated immediately after the start timing. Therefore, the recording is started after the signal intensity level of the recording data $D_{WT}$ is increased according to the same fade-in characteristic as that of the replaced data $D_C$. The reproduced waveform of the audio data $D_{AO}$, which is obtained after the addition by the adder 38 at the time of reproducing the recording data $D_{WT}$, shows the same fade-in characteristic as that of the replaced data $D_C$ as shown at the bottom of FIG. 6B, and the reproduction is started in this manner.

Next, the description will be given of the processing when the information recording is interrupted and then restarted from the interrupted position, with reference to FIGS. 7 and 8. First, during the information recording, the multiplying processing of the window functions are performed in the multiplying unit 26 (step S1). Then, it is checked whether or not the CPU 30 recognized the interruption of the information recording based on the control signal $C_1$ indicating that an instruction indicating the interruption of the information recording is inputted in the operation unit 9 (step S10). If the interruption is not instructed (step S10;No), the normal filtering processing described above is performed (steps S5 and S6). If the recording interruption is instructed in step S10, the input of the audio data $D_{AI}$ is stopped (step S11).

Then, out of the generated multiplied data $D_{WW}$ (see. 3rd stage in FIG. 8), the multiplied data $D_{WW}$ obtained by multiplying the window function including the interruption timing is replaced with zero data to generate the replaced data $D_C$ shown in the 4th stage in FIG. 8 (step S3). Then, the FFT processing is performed by using the replaced data $D_C$, and thus the processing is interrupted.

By this, the level of the recording data $D_{WT}$ immediately before the interruption has the same fade-out characteristic as the fade-out characteristic of the replaced data $D_C$ generated immediately before the interruption. Therefore, the recording is interrupted after the signal level of the recording data $D_{WT}$ is reduced according to the same fade-out characteristic as that of the replaced data $D_C$. The reproduced waveform of the audio data $D_{AO}$, which is obtained after the addition by the adder 38 at the time of reproducing the recording data $D_{WT}$, shows the same fade-out characteristic as that of the replaced data $D_C$ as shown at the bottom of FIG. 8, and thus the reproduction is interrupted.

During the interruption, it is repeatedly checked whether or not the CPU 30 recognized the restart of the information recording based on the control signal $C_1$ indicating that an instruction indicating the restart of the information recording is inputted in the operation unit 9 (step S12). If the restart is not instructed (step S12;No), the interruption is continued. If the restart is instructed (step S12;Yes), out of the generated multiplied data $D_{WW}$ (see. 3rd stage in FIG. 8), the multiplied data $D_{WW}$ obtained by multiplying the window function including the restart timing is replaced with zero data to generate the replaced data $D_C$ shown in the 4th stage in FIG. 8 (step S3). Then, the processing of steps S5 and S6 are performed for the replaced data $D_C$.

As a result, the level of the recording data $D_{WT}$ immediately after the recording restart timing has the same fade-in characteristic as the fade-in characteristic of the replaced data DC generated immediately after the restart timing. Therefore, the recording is restarted after the signal intensity level of the recording data $D_{WT}$ is increased according to the same fade-in characteristic as that of the replaced data $D_C$. The reproduced waveform of the audio data $D_{AO}$, which is obtained after the addition by the adder 38 at the time of reproducing the recording data $D_{WT}$, shows the same fade-in characteristic as that of the replaced data $D_C$ as shown at the bottom of FIG. 8, and thus the reproduction is restarted.

As described above, according to the processing of the analyzing filter unit 20 of the first embodiment, when the information recording is ended, the multiplied data $D_{WW}$ corresponding to the window function including the ending timing is changed to zero data, the zero data is recorded on the optical disc 2, and then the recording is ended. The level change of recording data $D_{WT}$ immediately before the recording ending timing becomes similar to the change in the fade-out of the window function level. Hence, the fade-out can be performed by a simple processing at the recording ending timing, and audible noise generation due to the sudden decrease of the recording level at the time of recording ending timing may be avoided.

Further, in starting information recording, since the multiplied data $D_{WW}$ corresponding to the window function including the recording start timing is changed to zero data, the zero data is recorded on the optical disc 2 in place of the multiplied data $D_{WW}$ including the start timing, and then the recording is started. The level change of recording data $D_{WT}$ immediately after the recording start timing becomes similar to the change of the fade-in of the window function level. Hence, the fade-in can be performed by a simple processing at the recording start timing, and audible noise generation due to the sudden increase of the recording level at the recording end timing may be avoided.

Still further, in interrupting information recording, the multiplied data $D_{WW}$ corresponding to the window function including the interruption timing is changed to zero data, the zero data is recorded on the optical disc 2 in place of the multiplied data $D_{WW}$ including the interruption timing, and then the recording is interrupted. In restarting information recording, the multiplied data $D_{WW}$ corresponding to the window function including the restart timing is changed to zero data, the zero data is recorded on the optical disc 2 in place of the multiplied data $D_{WW}$ including the restart timing, and then the recording is restarted. The level change of recording data $D_{WT}$ immediately before the interruption or immediately after the restart becomes similar to the change of the fade-out or fade-in of the window function level. Hence, the fade-in or fade-out can be performed by a simple processing at the recording interruption or restart timing, and audible noise generation due to the sudden successive change of the recording level at the recording interruption or restart timing may be avoided.

Still further, since each of the plural window functions has half-period overlapping with the neighboring window function on the time axis, it is possible to generate and record accurate recording data $D_{WT}$ in respect of the original audio data $D_{AI}$.

Still further, since the plural window functions are mainly used for eliminating the block distortion in the MDCT coding system, at the time of ending or start or interruption/restart of recording audio data $D_{AI}$ using the MDCT coding system, the fade-in or fade-out may be performed with simple processing and the audible noise generation may be avoided.

According to the information recording and reproducing apparatus 1 of the first embodiment, the time progress in recording the audio data $D_{AI}$ is stopped simultaneously with the recording interruption and is restarted simultaneously with the recording restart. Therefore, when the video data $D_{VI}$ and the audio data $D_{AI}$ are recorded on the optical disc 2 with associating them with each other, it is possible to avoid time base shift between the video data $D_{VI}$ and the audio data $D_{AP}$, which is generated if the audio data $D_{AI}$ is faded out with instantly stopping the recording of the video data $D_{VI}$ at the time of interruption (i.e., the time of the audio data $D_{AI}$ is still progressing during fade-out whereas the time of the video data $D_{VI}$ stops simultaneously with the recording interruption, and hence time base of the video data $D_{VI}$ and the audio data $D_{AI}$ may be shifted.).

[II] 2nd Embodiment

Figure 9A:
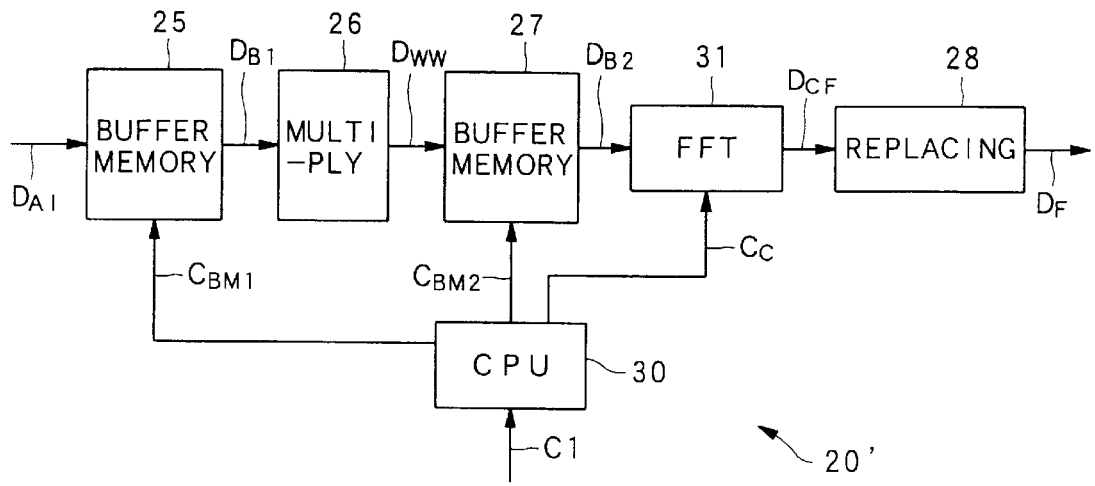
FIG. 9A is a block diagram showing detailed configuration of an analyzing filter according to a second embodiment.
Figure 9B:
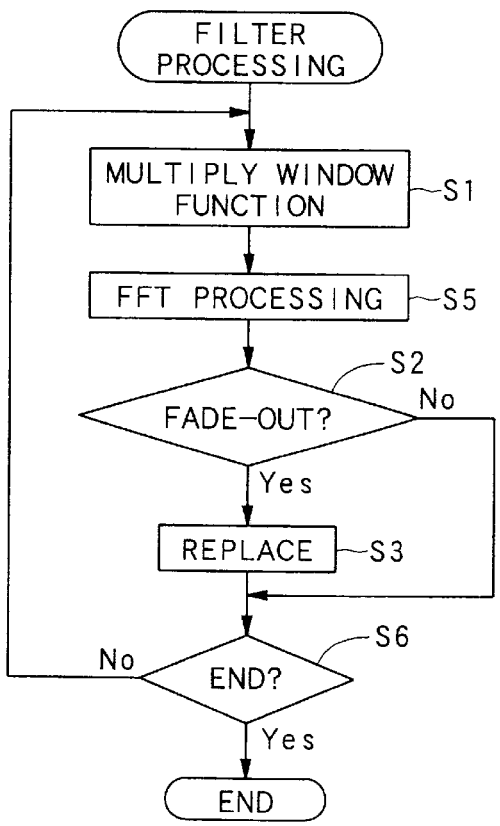
FIG. 9B is a flowchart showing filtering processing at the recording ending time according to the second embodiment.

Next, the second embodiment of the present invention will be described with reference to FIGS. 9A and 9B. FIG. 9A is a block diagram showing the configuration of the analyzing filter according to the second embodiment, and FIG. 9B is a flowchart showing the operation of the analyzing filter according to the second embodiment. It is noted that the same component and step as those in the first embodiment are represented by the same reference numerals and step numbers.

In the first embodiment described above, the analyzing filter carries out the multiplying processing, the replacing processing, addition and then the FFT processing in this order. In the second embodiment, the order of those processing is different from that of the first embodiment. In the second embodiment, the configuration and operation of the elements other than the analyzing filter unit are the same as those in the first embodiment, and hence the description thereof will be omitted.

As shown in FIGS. 9A and 9B, at the time of ending the recording with the analyzing filter unit 20' of the second embodiment, first the buffer memory 25, the multiplying unit 26 and the buffer memory 27 perform the multiplying processing and the accumulating processing to the buffer memory 27 like the first embodiment (step S1). Then, the FFT unit 31 applies the FFT processing onto the respective memory data $D_{B2}$ for each window function stored in the buffer memory 27 (step S5). Then, the replacing unit 28 performs the replacing processing, which replaces the frequency-domain data $D_{CF}$ for each window function after the FFT processing with zero data, at the recording end timing (step S2; Yes), and then the replaced data (frequency-domain data) for each window function is generated as the filtered data $D_F$ (step S3).

By using the filtered data $D_F$ generated by this filtering processing, the reproduction level of the audio data $D_{AO}$ at in reproduction after the recording has the similar fade-out characteristic as that of the window function level (see. The bottom of FIG. 6A). In addition, at the recording start timing or the recording interruption/restart timing, by performing the filtering processing in the order of the multiplying processing, the FFT processing, the replacing processing and the addition like the above-mentioned recording end timing, the reproduction level change of the audio data $D_{AO}$ similar to that at the time of recording start or recording interruption/restart may be obtained (see. the bottom of FIG. 6B and 8). As described above, by the operation of the analyzing filter unit 20' of the second embodiment, the same result as that by the analyzing filter unit 20 of the first embodiment may be obtained.

[III] 3rd Embodiment

Figure 10A:
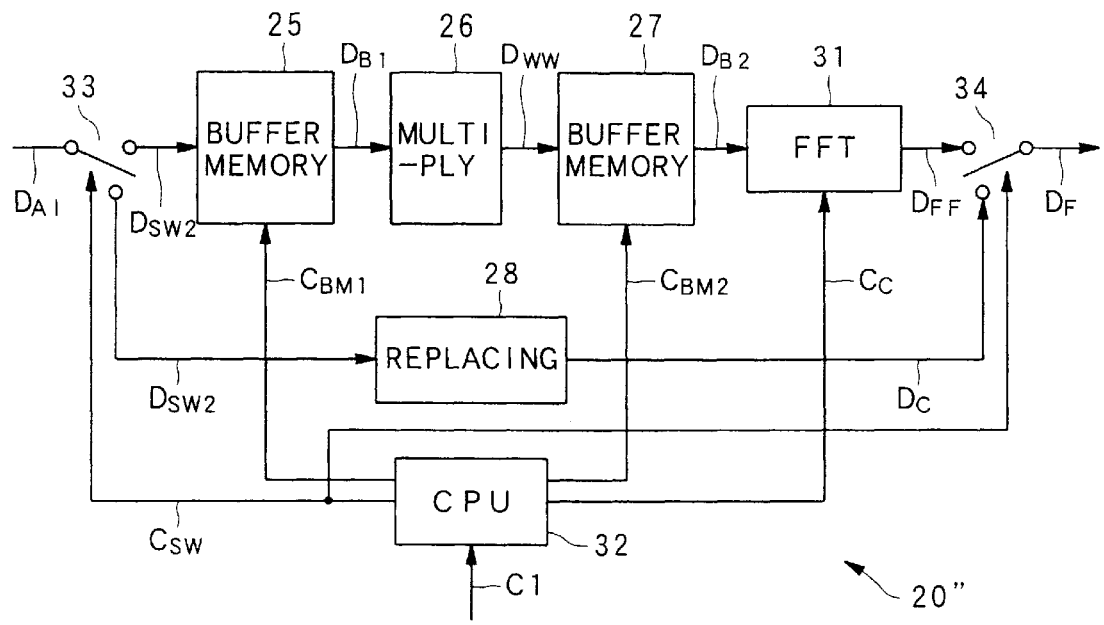
FIG. 10A is a block diagram showing detailed configuration of an analyzing filter according to a third embodiment.
Figure 10B:
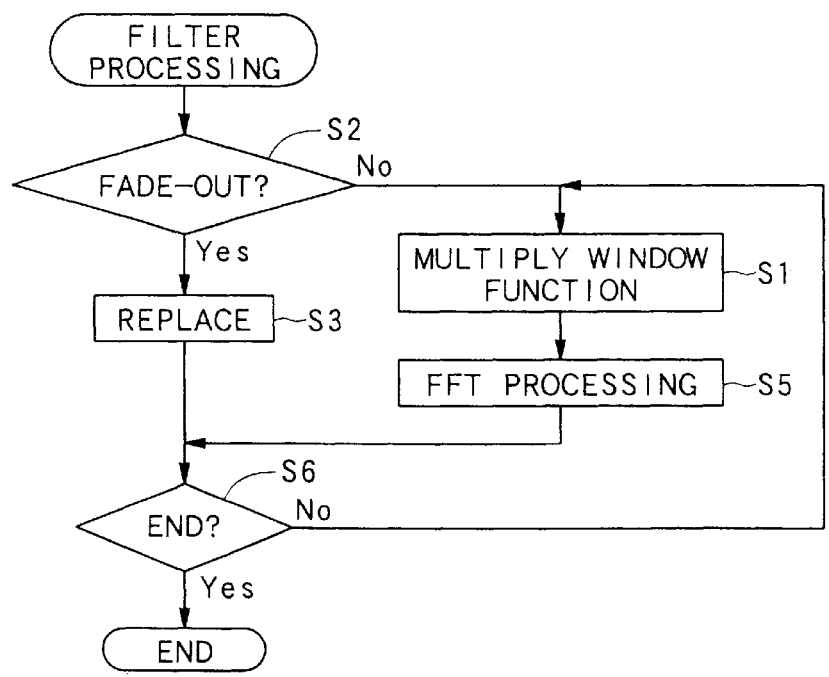
FIG. 10B is a flowchart showing filtering processing at the recording ending time according to the third embodiment.

Next, the third embodiment of the present invention will be described with reference to FIGS. 10A and 10B. FIG. 10A is a block diagram showing the configuration of the analyzing filter unit according to the third embodiment, and FIG. 10B is a flowchart showing the operation of the analyzing filter unit according to the third embodiment. It is noted that the same elements and steps as those in the first embodiment will be represented by the same reference numerals and step numbers.

In the third embodiment, the analyzing filter unit performs the filtering processing different from those in the first and the second embodiments. In this third embodiment, the configuration and the operation of the elements other than the analyzing filter unit are the same as those in the information recording and reproducing apparatus 1 of the first embodiment, and hence the description thereof will be omitted.

As shown in FIG. 10A, the analyzing filter unit 20" of the third embodiment includes the buffer memory 25, 27, the multiplying unit 26, the replacing unit 28 and the FFT unit 31, which are same as those in the first embodiment. Further, the analyzing filter unit 20" includes the CPU 32 and the switches 33, 34.

Next, the operation of the analyzing filter unit 20" at the recording end timing will be described with reference to FIGS. 10A and 10B. In the third embodiment, the switch 33 is connected to the side of the buffer memory 25 based on the control signal $C_{SW}$ from the CPU 32 during the continuous information recording (step S2; No), and the switch 34 is connected to the side of the FFT unit 31 based on the control signal $C_{SW}$. The audio data $D_{AI}$ inputted during the information recording is outputted from the switch 33 as the switch signal $D_{SW2}$ and is inputted to the buffer memory 25. After that, the buffer memory 25, 27, and the multiplying unit 26 perform the window function multiplying processing onto the audio data $D_{AI}$ (step S1). The FFT unit 31 applies the FFT processing onto the buffer data $D_{B2}$ generated by the window function multiplying processing to generate the frequency-domain data $D_{FF}$ (step S5), which is outputted to the quantizing unit 21 as the filtered data $D_F$ via the switch 34 connected to the FFT unit 31 side.

On the other hand, at the recording end timing, it is checked whether or not the instruction indicating the end of the information recording is inputted in the operation unit 9 and the CPU 32 recognized it by the control signal $C_1$ (step S2). If the recording end is not instructed (step S2; No), the processing during the information recording is continued. If the recording end is instructed in step S2 (step S2; Yes), out of the inputted audio data $D_{AI}$, only the audio data $D_{AI}$ of the time corresponding to the window function including the recording end timing is replaced with zero data (step S10). At this time, the switches 33 and 34 are turned over to the replacing unit 28 side based on the control signal $C_{SW}$, and the audio data $D_{AI}$ outputted as the switch data $D_{SW2}$ (audio data $D_{AI}$ of the time corresponding to the window function including the recording end timing) is inputted to the replacing unit 28. Thus, the inputted audio data $D_{AI}$ is replaced with zero data.

The switch 33 is turned over to the buffer memory 25 side after the audio data $D_{AI}$ of the time corresponding to the window function including the recording end timing is inputted to the replacing unit 28, and outputs the inputted audio data $D_{AI}$ to the buffer memory 25. Further, the switch 34 is turned over to the FFT unit 31 side again after the zero data of the time corresponding to the window function including the recording end timing is outputted to the quantizing unit 21 as the filter data $D_F$, and outputs the frequency-domain data $D_{FF}$, continuously inputted, to the quantizing unit 21. Thereafter, the processing of step S6 in the first and the second embodiments is performed. If all audio data $D_{AI}$ is processed (step S6; Yes), the process ends. If audio unprocessed data $D_{AI}$ remains (step S6; No), the process goes back to step S1 to perform the processing of steps S1, S5 and S6 onto the inputted audio data $D_{AI}$.

As described above, by using the filtered data $D_F$ generated by this filtering processing of the third embodiment, the reproduction level of the audio data $D_{AO}$ in reproduction has the similar fade-out characteristic as that of the window function level (see. The bottom of FIG. 6A). In addition, at the time of recording start or recording interruption/restart, by replacing the audio data $D_{AI}$ corresponding to the window function including the recording start timing or recording interruption/restart timing with zero data and audio data corresponding to other timing is subjected to the window function multiplying and FFT processing to generate the filtered data $D_F$, the reproduction level change of the audio data $D_{AO}$ similar to that at the time of recording start or recording interruption/restart in the first embodiment may be obtained (see. the bottom of FIG. 6B and 8). As described above, by the operation of the analyzing filter unit 20" of the third embodiment, the same result as that by the analyzing filter unit 20 of the first embodiment may be obtained.

The respective embodiments show the configuration in which the filtering processing of the present invention is applied to the audio data $D_{AI}$. Other than this, the present invention is applicable to the recording ending processing, recording start processing and recording interruption/restart processing of the video data $D_{VI}$. Further, the above embodiments use the window function corresponding to the MDCT system. However, the present invention is broadly applicable to the case where information is processed by using window function having fade-in and fade-out characteristic.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The disclosure of Japanese Patent Application No.11-190720 filed on Jul. 5, 1999 including the specification, claims, drawings and summary is incorporated herein by reference in its entirety.

What is claimed is:

1. An information recording apparatus for recording digital information inputted from outside onto an information storage medium, comprising:

a multiplexing unit for multiplying the digital information by a plurality of window functions to generate a plurality of multiplied digital information, each of the plurality of window functions having a time domain characteristic including a fade-in portion and a fade-out portion and having overlaps with neighboring window functions on time domain;

a recording unit for recording the plurality of multiplied digital information corresponding to the respective window functions;

an interruption unit for changing interruption multiplexed digital information which are the multiplied digital information corresponding to the window function including a recording interruption timing of the digital information to zero information, and for interrupting recording the digital information after recording the zero information onto the information storage medium in place of the interruption multiplexed digital information; and a restarting unit for changing the multiplied digital information corresponding to the window function including a recording restart timing of the digital information to zero information, and for restarting recording the digital information to be recorded after the recording restart timing, after recording the zero information onto the information storage medium.

2. An information recording apparatus according to claim 1, wherein each of the window functions has the overlap for a half of a time period of the window function on a time domain.

3. An information recording apparatus for recording digital information inputted from outside onto an information storage medium, comprising:

a multiplexing unit for multiplexing the digital information by a plurality of window functions to generate a plurality of multiplied digital information, each of the plurality of window functions having a time domain characteristic including a fade-in portion and a fade-out portion and having overlaps with neighboring window functions on time domain;

a recording unit for recording the plurality of multiplied digital information corresponding to the respective window functions;

an interruption unit for changing the digital information including a recording interruption timing of the digital information to zero information, and for interrupting recording the digital information after recording the zero information onto the information storage medium in place of the multiplexed digital information including the recording interruption timing; and a restarting unit for changing, after a recording interruption, the digital information including a recording restart timing of the digital information to zero information, and for restarting recording the digital information to be recorded after the recording restart timing, after recording the zero information onto the information storage medium in place of the multiplexed digital information including the recording restart timing.

4. An information recording apparatus according to claim 3, wherein each of the window functions has the overlap for a half of a time period of the window function on a time domain.

5. An information recording method for recording digital information inputted from outside onto an information storage medium, comprising the steps of:

multiplying the digital information by a plurality of window functions to generate a plurality of multiplied digital information, each of the plurality of window functions having a time domain characteristic including a fade-in portion and a fade-out portion and having overlaps with neighboring window functions on time domain; recording the plurality of multiplied digital information corresponding to the respective window functions;

changing interruption multiplexed digital information which are the multiplied digital information corresponding to the window function including a recording interruption timing of the digital information to zero information, and interrupting recording the digital information after recording the zero information onto the information storage medium in place of the interruption multiplexed digital information; and changing the multiplied digital information corresponding to the window function including a recording restart timing of the digital information to zero information, and restarting recording the digital information to be recorded after the recording restart timing, after recording the zero information onto the information storage medium.

6. An information recording method according to claim 5, wherein each of the window functions has the overlap for a half of a time period of the window function on a time domain.

7. An information recording method for recording digital information inputted from outside onto an information storage medium, comprising the steps of:

multiplexing the digital information by a plurality of window functions to generate a plurality of multiplied digital information, each of the plurality of window functions having a time domain characteristic including a fade-in portion and a fade-out portion and having overlaps with neighboring window functions on time domain;

recording the plurality of multiplied digital information corresponding to the respective window functions;

changing the digital information including a recording interruption timing of the digital information to zero information, and interrupting recording the digital information after recording the zero information onto the information storage medium in place of the multiplexed digital information including the recording interruption timing; and changing, after a recording interruption, the digital information including a recording restart timing of the digital information to zero information, and restarting recording the digital information to be recorded after the recording restart timing, after recording the zero information onto the information storage medium in place of the multiplexed digital information including the recording restart timing.

8. An information recording method according to claim 7, wherein each of the window functions has the overlap for a half of a time period of the window function on a time domain.

* * * * *